(12) United States Patent
Yi et al.

(10) Patent No.: US 10,878,739 B2
(45) Date of Patent: Dec. 29, 2020

(54) DISPLAY APPARATUS AND CONTROLLING METHOD THEREOF

(71) Applicant: SAMSUNG ELECTRONICS CO., LTD., Suwon-si (KR)

(72) Inventors: Sanghun Yi, Suwon-si (KR); Jeongryeol Seo, Suwon-si (KR); Sanghoon Oh, Suwon-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 0 days.

(21) Appl. No.: 16/456,703

(22) Filed: Jun. 28, 2019

(65) Prior Publication Data
US 2020/0005699 A1    Jan. 2, 2020

(30) Foreign Application Priority Data

Jul. 2, 2018    (KR) .......................... 10-2018-0076428

(51) Int. Cl.
*G09G 3/20* (2006.01)
*G09G 3/32* (2016.01)
*G06T 1/00* (2006.01)

(52) U.S. Cl.
CPC ............. *G09G 3/2018* (2013.01); *G09G 3/32* (2013.01); *G06T 1/0028* (2013.01);
(Continued)

(58) Field of Classification Search
CPC .......... H04N 2005/91307; H04N 2005/91314; H04N 2005/91335; H04N 2005/91357;
(Continued)

(56) References Cited

U.S. PATENT DOCUMENTS 6,529,600 B1 * 3/2003 Epstein .................... H04N 5/74
348/E5.137
6,950,532 B1 * 9/2005 Schumann ............. G03B 21/26
353/30
(Continued)

FOREIGN PATENT DOCUMENTS

JP    2002-314938 A    10/2002
JP    2003-302960 A    10/2003
(Continued)

OTHER PUBLICATIONS

International Search Report (PCT/ISA/210) dated Oct. 17, 2019 issued by the International Searching Authority in International Application No. PCT/KR2019/007645.
(Continued)

*Primary Examiner* — Sardis F Azongha
(74) *Attorney, Agent, or Firm* — Sughrue Mion, PLLC

(57) ABSTRACT

Disclosed is a display apparatus in which each pixel corresponds to at least one light-emitting element. The display apparatus includes a display including a plurality of pixels, a driver configured to drive a plurality of light-emitting elements constituting the plurality of pixels, and a processor configured to control the driver to drive the plurality of light-emitting elements based on a first pulse width modulation signal having a duty corresponding to a grayscale of an input image, and to control the driver to drive light-emitting elements constituting a specific pixel, among the plurality of pixels, using a second PWM signal having a duty corresponding to the grayscale of the input image, wherein a frequency of the first PWM signal is different from a frequency of the second PWM signal.

16 Claims, 13 Drawing Sheets

(52) U.S. Cl.
CPC .............. *G06T 2201/0064* (2013.01); *G09G 2300/026* (2013.01); *G09G 2320/0606* (2013.01); *G09G 2320/0613* (2013.01); *G09G 2354/00* (2013.01); *G09G 2358/00* (2013.01)

(58) Field of Classification Search
CPC .......... H04N 2005/91392; H04N 5/913; G06T 1/005; G06T 1/0071; G06T 1/0085; G09G 3/2018; G09G 3/32; G09G 3/3208
See application file for complete search history.

(56) References Cited

U.S. PATENT DOCUMENTS

| | | | |
|---|---|---|---|
| 7,043,019 B2 | 5/2006 | Tehranchi et al. | |
| 7,050,076 B2 | 5/2006 | Nishi et al. | |
| 7,386,125 B2* | 6/2008 | Bilobrov | H04N 5/913 |
| | | | 359/379 |
| 7,756,288 B2* | 7/2010 | Lubin | G06T 1/0028 |
| | | | 382/100 |
| 8,428,299 B2* | 4/2013 | Thiebaud | G06T 1/0028 |
| | | | 382/100 |
| 8,904,473 B2* | 12/2014 | Sambamurthy | G06F 21/554 |
| | | | 726/1 |
| 2002/0168069 A1 | 11/2002 | Tehranchi et al. | |
| 2007/0013770 A1 | 1/2007 | Kervec et al. | |
| 2007/0172057 A1 | 7/2007 | Bourdon et al. | |
| 2009/0052728 A1 | 2/2009 | Blonde et al. | |
| 2010/0039568 A1* | 2/2010 | Tchoukaleysky | H04N 9/3179 |
| | | | 348/720 |
| 2012/0140978 A1 | 6/2012 | Kim et al. | |
| 2015/0154725 A1* | 6/2015 | Kuraki | G06T 1/0064 |
| | | | 382/100 |
| 2015/0304522 A1 | 10/2015 | Van Herpen et al. | |
| 2015/0371353 A1* | 12/2015 | Neumann | G06T 1/0085 |
| | | | 382/100 |
| 2016/0210473 A1* | 7/2016 | Cohen | G06K 9/00255 |
| 2018/0286321 A1* | 10/2018 | Gao | G09G 3/3406 |

FOREIGN PATENT DOCUMENTS

| | | |
|---|---|---|
| JP | 3674593 B2 | 7/2005 |
| JP | 3674606 B2 | 7/2005 |
| JP | 2010-278573 A | 12/2010 |
| KR | 10-2005-0074867 A | 7/2005 |
| KR | 20-2009-0008343 U | 8/2009 |
| KR | 10-2012-0060350 A | 6/2012 |
| KR | 10-1319562 B1 | 11/2013 |
| KR | 10-2018-0002786 A | 1/2018 |
| WO | 2016196390 A1 | 12/2016 |

OTHER PUBLICATIONS

Written Opinion (PCT/ISA/237) dated Oct. 17, 2019 issued by the International Searching Authority in International Application No. PCT/KR2019/007645.

* cited by examiner (a)

(b)

(c)

(d)

(e)

(f)

DISPLAY APPARATUS AND CONTROLLING METHOD THEREOF

CROSS-REFERENCE TO RELATED APPLICATION(S)

This application is based on and claims priority under 35 U.S.C. § 119 to Korean Patent Application No. 10-2018-0076428, filed on Jul. 2, 2018, in the Korean Intellectual Property Office, the disclosure of which is incorporated by reference herein in its entirety.

BACKGROUND

1. Field

The disclosure relates to a display apparatus and, more particularly, to a display apparatus for preventing unauthorized photographing of contents displayed on the display apparatus by differentiating frequencies of pulse width modulation (PWM) signals for driving a plurality of light-emitting elements corresponding to a plurality of pixels.

2. Description of Related Art

In order to protect profits of copyright holders, distributors, and content providers in the content providing industry, security or protection of contents is very important.

In particular, in order to prevent image contents from being exposed due to unauthorized or illegal photographing of image contents provided through a display apparatus, unauthorized or illegal photographing has been prevented in the related art using a technology such as emitting infrared light, which is not recognized by the naked eyes but is captured by a digital camera or a video camera.

However, with recent development of camera technology, the infrared light emitted along with the image contents may be absorbed or blocked through an infrared (IR) filter or a blue filter included in the camera, and thus, the technology to protect image contents by emitting infrared light no longer has significant effect.

In addition, in order to emit infrared light, an additional device such as an infrared light generating and emitting device is required, which leads to additional costs.

SUMMARY

Provided is a display apparatus that separately controls light-emitting elements in the display without any additional equipment.

Additional aspects will be set forth in part in the description which follows and, in part, will be apparent from the description, or may be learned by practice of presented embodiments.

According to an aspect of the disclosure, there is provided a display apparatus in which each pixel corresponds to one or more light-emitting elements, the display apparatus including: a display including a plurality of pixels; a driver configured to drive a plurality of light-emitting elements corresponding to the plurality of pixels; and a processor configured to: control the driver to drive one or more light-emitting elements corresponding to a first pixel, among the plurality of pixels, based on a first pulse width modulation (PWM) signal having a duty corresponding to a grayscale of an input image, control the driver to drive one or more light-emitting elements corresponding to a second pixel, among the plurality of pixels, based on a second PWM signal having the duty corresponding to the grayscale of the input image, wherein a frequency of the first PWM signal is different from a frequency of the second PWM signal.

The processor may be configured to divide the plurality of pixels into a plurality of groups, and to control the driver to drive light-emitting elements corresponding to pixels of one or more groups among the plurality of groups based on the second PWM signal.

The display may include a plurality of modular displays each of which includes one or more pixels; and the processor may be configured to divide the plurality of pixels into the plurality of groups corresponding to the plurality of modular displays.

The processor may be configured to divide the plurality of pixels arranged in a form of a matrix into the plurality of groups in a unit of a row or a column.

The second pixel may be a pixel in which a specific pattern is displayed, among the plurality of pixels.

The specific pattern may correspond to a watermark for security of the input image.

The frequency of the second PWM signal may be less than a frequency corresponding to a shutter speed of at least one external photographing device that photographs an image.

The frequency of the second PWM signal may be greater than a frequency corresponding to a visual characteristic of a human.

The processor, based on at least one of a type of content of the input image and a user setting, may be configured to control the driver to drive the one or more light-emitting elements corresponding to the second pixel based on the second PWM signal.

The frequency of the second PWM signal may be less than the frequency of the first PWM signal.

According to an aspect of the disclosure, there is provided a controlling method of a display apparatus in which each pixel corresponds to one or more light-emitting elements, the method including: acquiring a first PWM signal having a duty corresponding to a grayscale of an input image, and a second PWM signal having the duty corresponding to the grayscale of the input image; driving one or more light-emitting elements corresponding to a first pixel, among the plurality of pixels, based on the first PWM signal; and driving one or more light-emitting elements corresponding to a second pixel, among the plurality of pixels, based on the second PWM signal, wherein a frequency of the first PWM signal is different from a frequency of the second PWM signal.

The driving the one or more light-emitting elements corresponding to the second pixel may include: dividing the plurality of pixels into a plurality of groups; and driving light-emitting elements corresponding to pixels of one or more groups among the plurality of groups based on the second PWM signal.

The display apparatus may include a plurality of modular displays each of which includes one or more pixels; and the dividing the plurality of pixels into the plurality of groups may include dividing the plurality of pixels into the plurality of groups corresponding to the plurality of modular displays.

The dividing the plurality of pixels into the plurality of groups may include dividing the plurality of pixels arranged in a form of a matrix into the plurality of groups in a unit of a row or a column.

The second pixel may be a pixel in which a specific pattern is displayed, among the plurality of pixels.

The specific pattern may correspond to a watermark for security of the input image.

The frequency of the second PWM signal may be less than a frequency corresponding to a shutter speed of at least one external photographing device that photographs an image.

The frequency of the second PWM signal may be greater than a frequency corresponding to a visual characteristic of a human.

The driving the one or more light-emitting elements corresponding to the second pixel may include, based on at least one of a type of content of the input image and a user setting, driving the one or more light-emitting elements corresponding to the second pixel based on the second PWM signal.

The frequency of the second PWM signal may be less than the frequency of the first PWM signal.

According to an aspect of the disclosure, there is provided a non-transitory computer-readable recording medium having recorded thereon a program executable by a computer for performing the method.

According to an aspect of the disclosure, there is provided a processing apparatus including: a memory storing instructions; and at least one processor configured to execute the instructions to: obtain a first PWM signal for driving one or more light-emitting elements corresponding to a first pixel, among a plurality of pixels of a display, the first PWM signal having a duty corresponding to a grayscale of an input image, and obtain a second PWM signal for driving one or more light-emitting elements corresponding to a second pixel, among the plurality of pixels, the second PWM signal having the duty corresponding to the grayscale of the input image, wherein a frequency of the first PWM signal is different from a frequency of the second PWM signal.

The processor may be configured to divide the plurality of pixels into a plurality of groups, and to control to drive light-emitting elements corresponding to pixels of one or more groups among the plurality of groups based on the second PWM signal.

The second pixel may be a pixel in which a specific pattern is displayed, among the plurality of pixels.

The frequency of the second PWM signal may be less than a frequency corresponding to a shutter speed of at least one external photographing device that photographs an image.

The frequency of the second PWM signal may be greater than a frequency corresponding to a visual characteristic of a human.

The frequency of the second PWM signal may be less than the frequency of the first PWM signal.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
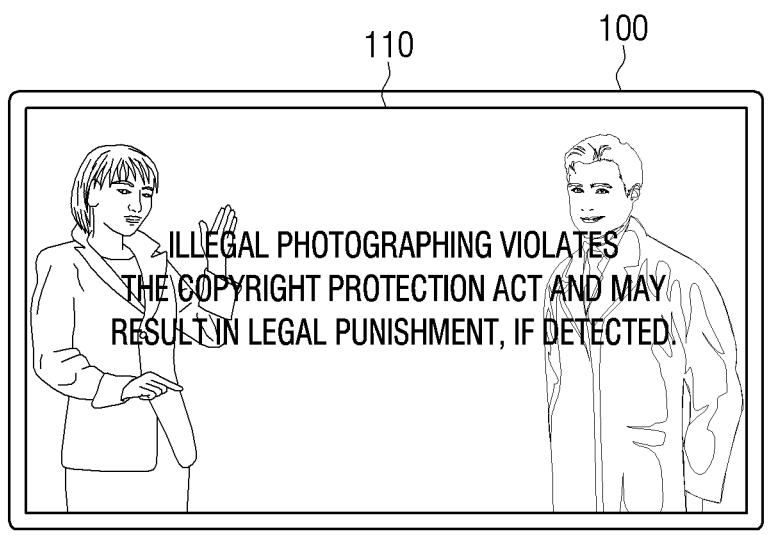
FIG. 1 is a view provided to describe an example of displaying a security image by the display apparatus according to an embodiment.

Hereinbelow, one or more embodiments of the present disclosure will be described in a greater detail with reference to the attached drawings.

Like reference numerals indicate like components that perform substantially the same functions throughout the specification. For convenience of description and understanding, the same reference numerals or symbols are used and described in different embodiments. In other words, although elements having the same reference numerals are all illustrated in a plurality of drawings, the plurality of drawings do not necessarily correspond to one embodiment.

Terms such as "first," "second," and so on may be used to describe a variety of elements, but the elements should not be limited by these terms. The terms are used only for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," "part," and so on is used to refer to an element that performs at least one function or operation, and such element may be implemented as hardware or software, or a combination of hardware and software. Further, other than when each of a plurality of "modules," "units," "parts," and the like must be realized in an individual hardware, the components may be integrated in at least one module or chip and be realized in at least one processor.

Also, when any part is connected to another part, this includes a direct connection and an indirect connection through another medium or component. Further, when a certain portion includes a certain element, unless specified to the contrary, this means that another element may be additionally included, rather than precluding another element.

In the disclosure, expressions such as "at least one of a, b or c" means "only a, only b, only c, both a and b, both a and c, both b and c, all of a, b, and c, or variations thereof."

FIG. 1 is a view provided to describe an example of displaying a security image by a display apparatus 100 according to an embodiment.

Referring to FIG. 1, a phrase "Illegal photographing violates the Copyright Protection Act and may result in legal punishment, if detected" is displayed to prevent illegal and/or unauthorized capturing or photographing of displayed content. It is understood, however, that one or more other embodiments are not limited to this phrase, and a different phrase and/or object(s) (e.g., graphical item) may be displayed.

As the above-described phrase is displayed, illegal and unauthorized photographing may be prevented, but if the above phrase is identified by naked eyes of a viewer viewing the image contents displayed on the display 110, it may be an obstacle to the user for viewing the image contents.

Therefore, the display apparatus 100 or a controlling method thereof according to an embodiment provides a security image that allows a viewer to see with naked eyes only pure image contents that do not include the phrase described above, whereas, when image contents displayed on the display 110 are photographed through an external photographing device, the security image causes the photographed image to be acquired in a state in which the above-described phrase is included in the image contents.

Hereinafter, detailed embodiments for providing a security image will be described with reference to the drawings.

Figure 2:
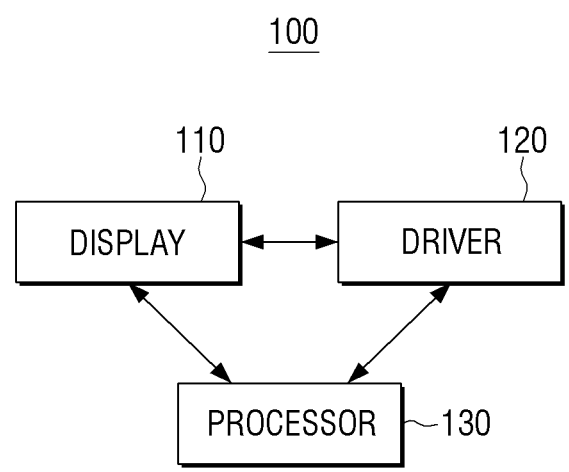
FIG. 2 is a block diagram provided to describe a configuration of the display apparatus according to an embodiment.

FIG. 2 is a block diagram provided to describe a configuration of a display apparatus 100 according to an embodiment.

The display apparatus 100 may be implemented as a TV, a smart TV, a terminal device, a smartphone, a mobile device, a screen for displaying an image, a kiosk, a personal computer (PC), a laptop PC, a tablet PC, a monitor, an electronic display board, an electronic picture frame, and the like.

Referring to FIG. 2, the display apparatus 100 according to an embodiment includes a display 110, a driver 120, and a processor 130.

The display 110 is configured to display an image. For this purpose, the display 110 may include one or more light-emitting elements. For example, the light emitting device may be implemented as a light emitting diode (LED), an organic light emitting diode (OLED), an active-matrix OLED (AMOLED), a micro LED, or the like.

The micro LED is an LED having a size of about 5-100 micrometers, and represents a micro light-emitting device that emits light by itself without a color filter.

The display 110 may include a plurality of pixels. Specifically, the display 110 may include a display panel for displaying an image, and the display panel may be divided into a plurality of pixel units for displaying an image.

As each pixel includes at least one light-emitting element, the light-emitting element may be used to implement the color sense and/or brightness of each pixel.

Figure 3:
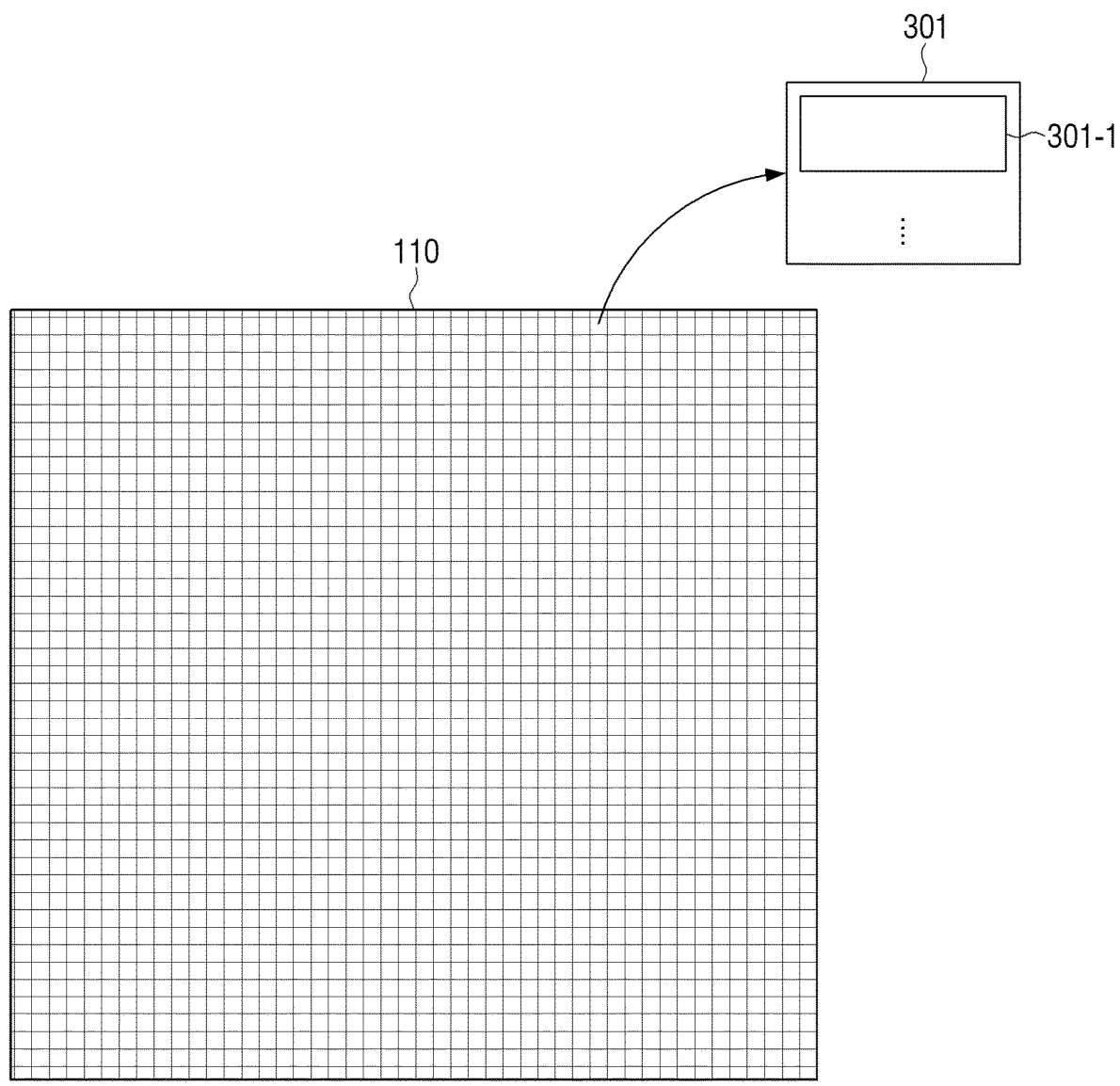
FIG. 3 is a view provided to describe a configuration of the display of the display apparatus according to an embodiment.

Referring to FIG. 3, the display 110 is divided into a plurality of pixels, and each pixel (e.g., 301) may include one or more light-emitting elements 301-1.

For example, three light-emitting elements may be provided for each pixel. In this case, the three light-emitting elements may express a color sense (e.g., emit light of a particular wavelength) that is different from each other, and may implement color sense and brightness per pixel in a diverse manner as a result of adjusting brightness relatively.

By way of example, each of light-emitting elements corresponding to red, green, and blue may be provided for each pixel.

The driver 120 may drive a plurality of light-emitting elements included in the display 110 based on a dimming signal and/or a pulse width modulation (PWM) signal corresponding to grayscale of the input image.

The driver 120 may be implemented as software and hardware, and as an electronic circuit capable of applying power corresponding to the dimming signal and/or the PWM signal to the light-emitting elements.

The brightness of light-emitting elements may depend on how much and how long power is supplied. Specifically, an amount of power that is supplied to the light-emitting elements varies according to the size of a dimming signal, and a length of time for providing power to the light-emitting elements is adjusted according to a duty of the PWM signal.

When the size of the dimming signal is constant, the driver 120 may adjust brightness of the light-emitting elements according to the duty of the PWM signal. At this time, the duty of the PWM signal may mean a ratio of time when the PWM signal is turned on, in each cycle of the PWM signal in which PWM signal repeats turning on and turning off.

In the meantime, when the cycle in which the PWM signal is turned on and off (hereinafter, referred to as a PWM cycle) and the PWM frequency (a reciprocal number of the PWM cycle) is changed, if the duty of the PWM signal is maintained, brightness of the light-emitting elements may be maintained.

In the meantime, when the cycle of turning the PWM signal on and off increases, that is, when the frequency of the PWM signal becomes smaller, a flicker phenomenon may occur.

In general, a light-emitting element repeatedly turns on and off at a high speed as a result of repeatedly turning on and off of the PWM signal at a high speed. When the light-emitting element is turned on and off at least 24 times per second, a viewer may perceive that the light-emitting element is continuously turned on according to the visual characteristic of a human.

In contrast, when the frequency of the PWM signal becomes very small, the flickering of the light-emitting element may be visually perceived as a result of the flickering speed of the light-emitting element becoming slower. This phenomenon, in which a screen is perceived as flickering is referred to as a flicker phenomenon.

In the meantime, the flicker phenomenon may appear not only in the case of viewing an image with naked eyes but also from an image obtained from a photographing device photographing the displayed image (i.e., an image capturing device such as a still camera or a video camera that captures an image, e.g., still image or moving image, of the display 110).

Specifically, when the frequency (flickering speed of the light-emitting element) of the PWM signal is smaller than the shutter speed (number per second) of the photographing device photographing the displayed image, for most of the unit time when the shutter of the photographing device is open, the light-emitting element to display an image may be turned off.

In this case, each time interval in which a shutter of the photographing device is opened is an interval for receiving light for generating each still image included in the image acquired from the photographing device. Thus, if the light emitting device is mostly turned off during a time interval where the shutter of the photographing device is opened, the brightness of some still images included in the image acquired from the photographing device may be relatively dark. As a result, the flicker phenomenon may occur even in the image is acquired from the photographing device.

When the flicker phenomenon is considered, by appropriately adjusting the frequency of the PWM signal, as the light-emitting element comes to have a flickering speed greater than the speed at which the flicker phenomenon is perceivable with the naked eyes, but less than the shutter speed of the photographing device, the security image of FIG. 1 may be provided.

Hereinafter, various embodiments will be described based on an operation of the processor 130 in view of the flicker phenomenon described above.

The processor 130 may control an overall operation of the display apparatus 100. For this purpose, the processor 130 may include a random access memory (RAM), a read only memory (ROM), a central processing unit (CPU), a graphic processing unit (GPU), a system bus, or the like, and may perform operations or data processing related to control of other components included in the display apparatus 100.

The processor 130 may display (i.e., control or output for display) an image through the display 110.

For this purpose, the processor 130 may acquire the grayscale information of the input image based on the data of the input image, and then control the driver 120 through the PWM signal and/or the dimming signal corresponding to the obtained grayscale information. At this time, the PWM signal and/or the dimming signal corresponding to the obtained grayscale information may be generated through a signal processing unit.

The processor 130 may drive the light-emitting elements constituting the plurality of pixels included in the display 110 using a first PWM signal having a duty corresponding to the grayscale of the input image. However, the processor 130 may control the driver 120 to drive light-emitting elements constituting a specific pixel using a second PWM signal having a duty corresponding to the grayscale of the input image, unlike the case of driving light-emitting elements constituting another pixel.

In this case, the frequencies of the first PWM signal and the second PWM may be different from each other, although both the first PWM signal and the second PWM signal have the same duty corresponding to the grayscale of the input image.

At this time, the frequency of the second PWM may be less than the frequency of the first PWM signal.

Specifically, the driver 120 that received the control of (i.e., is controlled by) the processor 130 may drive the light-emitting elements constituting a specific pixel among the plurality of pixels using the second PWM signal having relatively low frequency and duty corresponding to the grayscale of the input image, and drive the light-emitting elements constituting another pixel other than the specific pixel among the plurality of pixels using the first PWM signal having relatively high frequency and duty corresponding to the grayscale of the input image.

In this case, the frequency of the second PWM signal may be less than the frequency based on the shutter speed of one or more external photographing devices photographing an image. In other words, the second PWM signal of a frequency that is slower than the shutter speed of the external photographing device is repeatedly turned on and off and, as a result, the flicker phenomenon may occur in an image photographed through an external photographing device.

In addition, the frequency of the second PWM signal may be greater than a frequency based on human visual characteristics. As a result of using the low-frequency PWM signal, it is desirable that the flicker phenomenon occurs in the image photographed from the external photographing device, but is not perceived by a viewer viewing the image displayed on the display 110 with the naked eyes. In other words, the frequency of the second PWM signal may be greater than the PWM frequency with which the human may recognize the flicker phenomenon.

Meanwhile, the frequency of the first PWM signal may be greater than a frequency based on a human visual characteristic, and may be greater than a frequency based on a shutter speed of one or more external photographing devices for photographing an image.

Figure 4A:
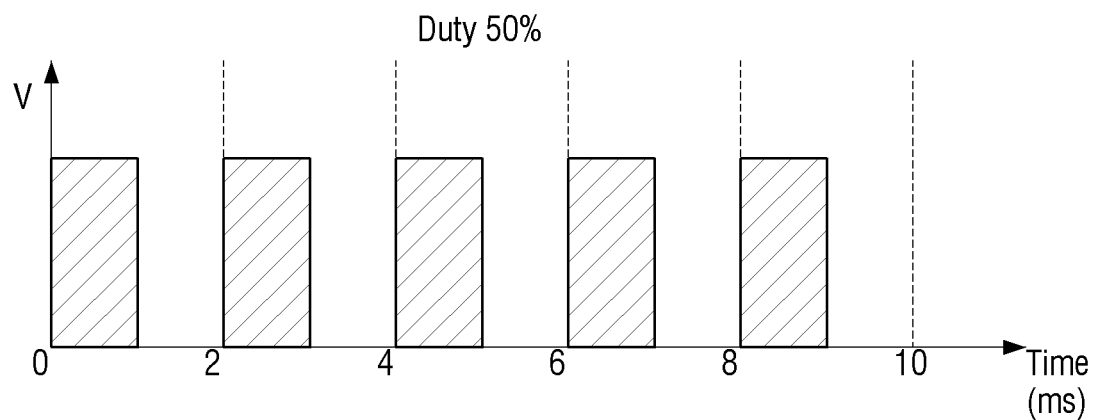
FIGS. 4A and 4B are graphs provided to describe a case in which frequencies of PWM signals having the same duty are different.
Figure 4B:
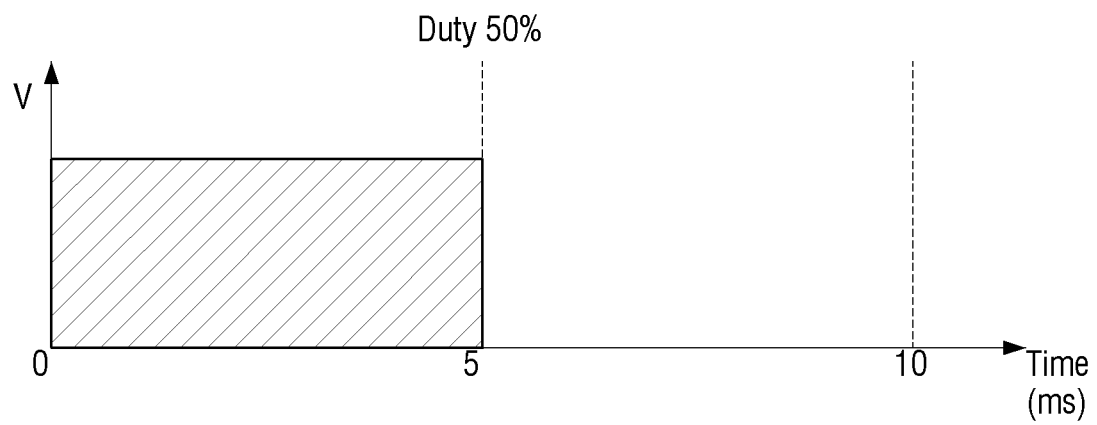

FIGS. 4A and 4B are graphs provided to describe a case in which frequencies of PWM signals having the same duty are different.

In FIGS. 4A and 4B, the duties of the PWM signals are identical (50%), but the frequencies are different from each other.

To be specific, the PWM frequency in FIG. 4A is 2 ms, whereas the PWM frequency in FIG. 4B is 5 ms. As described above, even if the PWM frequency of FIG. 4A is different from the PWM frequency of FIG. 4B, the duties are the same and thus, brightness of light-emitting elements is the same.

The processor 130 may control the driver 120 to drive the light-emitting elements constituting specific pixels among the plurality of pixels using the PWM signal having a low frequency (as in FIG. 4B, for example), and drive the light-emitting elements constituting the other pixels using the PWM signal having a high frequency (as in FIG. 4A, for example). However, specific numerical values for the frequencies are not limited to those exemplified in FIGS. 4A and 4B.

By using a method to adjust frequency of the PWM signal to be comparatively lower only for the light-emitting elements constituting a specific pixel among a plurality of pixels included in the display 110, the processor 130 may provide a security image including a specific pattern, text, or the like.

Figure 5:
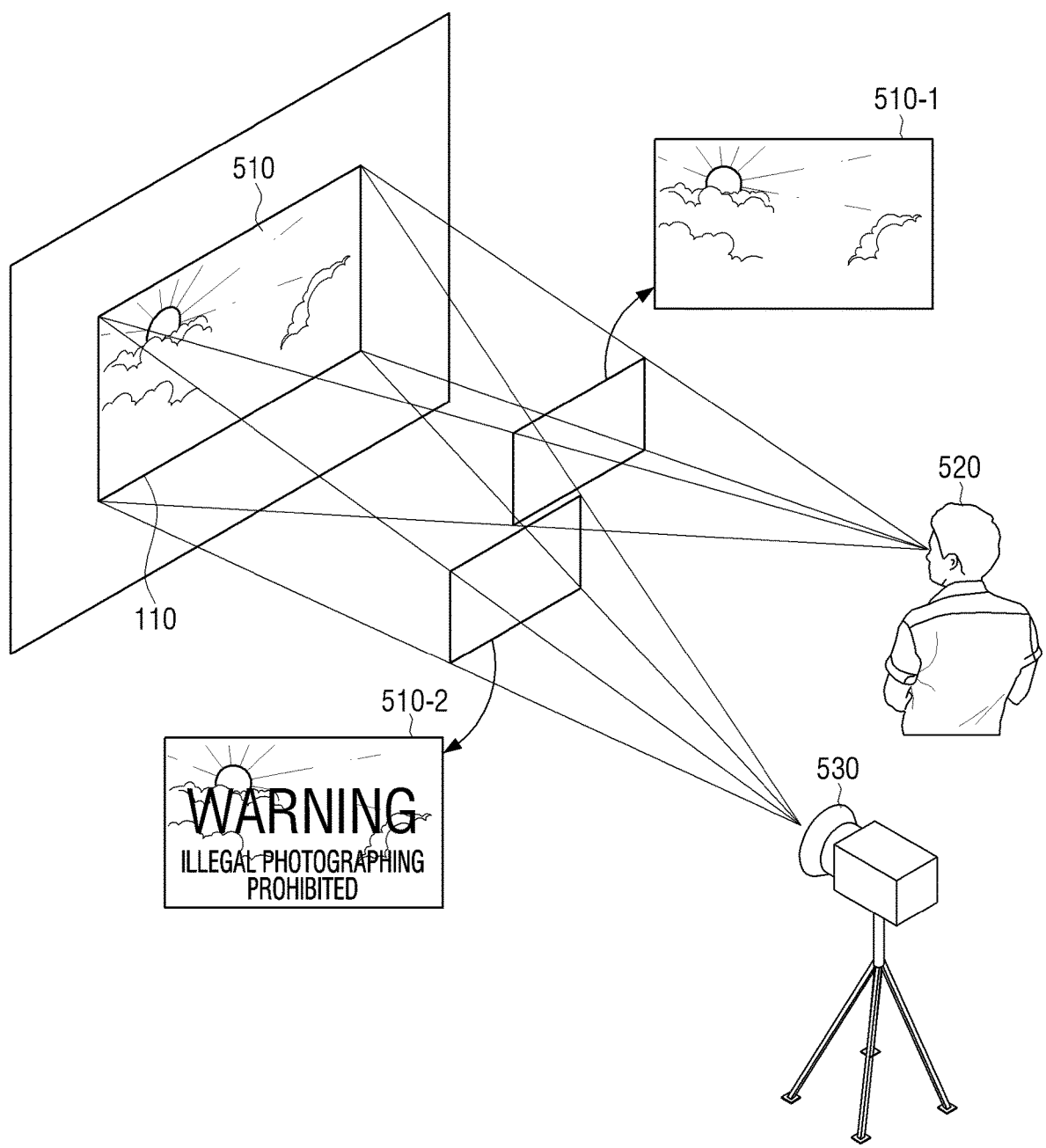
FIG. 5 is a view provided to describe a difference of a recognized image in each of a case where an image is viewed by naked eyes and a case where an image is photographed by an external photographing device.

FIG. 5 is a view provided to describe a difference of a recognized image in each of a case where a security image displayed through a screen of the display apparatus 100 is viewed by naked eyes and a case where the image is photographed by an external photographing device.

Referring to FIG. 5, in displaying an image 510 on the display 110, the driver 120 drives only the light-emitting elements constituting the specific pixels using the PWM signal having a relatively low frequency. As a result, an image 510-1 viewed by a viewer 520 is clean (i.e., unobstructed) while an image 510-2 photographed through an external photographing device 530 displays phrases "warning" and "illegal photographing prohibited" based on the flicker phenomenon.

That is, the processor 130 controls the driver 120 to drive only the light-emitting elements constituting the specific pixels corresponding to the area where the phrase such as "warning" and "illegal photographing prohibited" is displayed, using the second PWM signal having a relatively low frequency In driving only the light-emitting elements constituting the specific pixels among a plurality of pixels based on the second PWM signal, the processor 130 may divide a plurality of pixels into a plurality of groups.

If the display 110 includes a plurality of modular displays each of which includes one or more pixels, the processor 130 may divide a plurality of pixels into a plurality of groups in a modular display unit, as will be described below with reference to FIG. 6.

Figure 6:
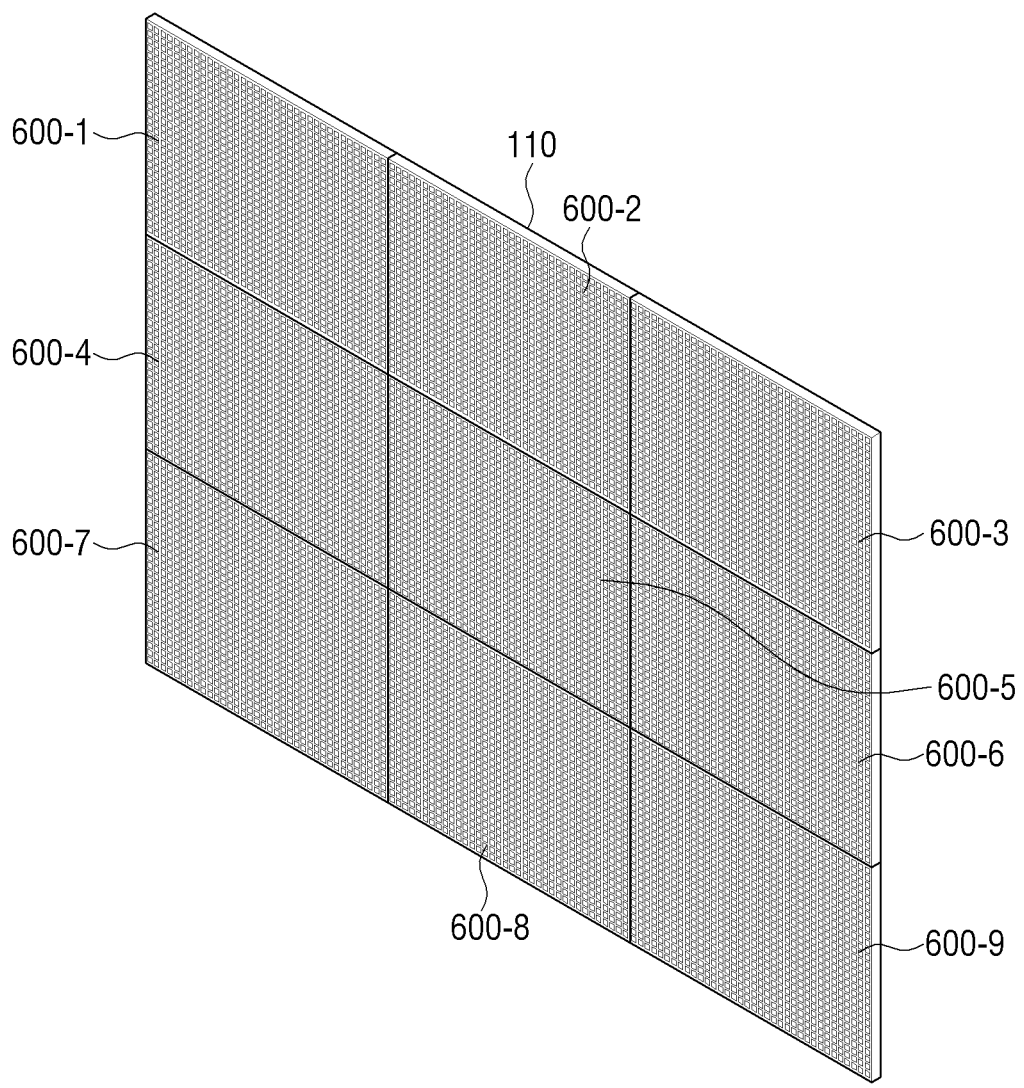
FIG. 6 is a view provided to describe a case in which a display apparatus including a plurality of modular displays provides a security image, according to an embodiment.

FIG. 6 is a view provided to describe a display 110 including a plurality of modular displays 600-1, 600-2, . . . , 600-9 connected to each other, according to an embodiment.

At this time, each of a plurality of modular displays 600-1, 600-2, . . . , 600-9 may be implemented as an LED or a micro LED display module, respectively, although it is understood that one or more other embodiments are not limited thereto. In addition, each of the plurality of modular displays 600-1, 600-2, . . . , 600-9 may include a plurality of pixels.

The processor 130 may divide the plurality of pixels included in the display 110 into groups of pixels corresponding to the respective modular displays and then change the frequency of the PWM signals in units of groups. Specifically, the processor 130 may control the driver 120 to drive the light-emitting elements constituting pixels of a specific group using the second PWM signal and drive the light-emitting elements constituting the pixels of another group based on the first PWM signal having a lower frequency as compared to the second PWM signal.

For example, referring to FIG. 6, the processor 130 may control the driver 120 to drive the light-emitting elements of the modular display 600-5 positioned at the center of the display 110 using the second PWM signal. As another example, the processor 130 may drive the light-emitting elements of some of the modular displays 600-1, 600-3, 600-5, 600-7, and 600-9 to correspond to the monochrome grid pattern using the second PWM signal. However, it is understood that one or more other embodiments are not limited to the above example.

Meanwhile, the processor 130 may divide a plurality of pixels arranged in a matrix form into a plurality of groups based on a unit of a row and/or column.

In general, it is not efficient for the driver 120 to drive each light-emitting element using each PWM signal corresponding to all the light-emitting elements included in the display 110, and thus, a plurality of pixels included in the display 110 may be arranged in a matrix form, and the driver 120 may drive a plurality of pixels arranged in a matrix form in units of rows and/or columns. In this case, the processor 130 may control the driver 120 to drive light-emitting elements constituting pixels of a specific row and/or column using the second PWM signal having a low frequency.

Figure 7A:
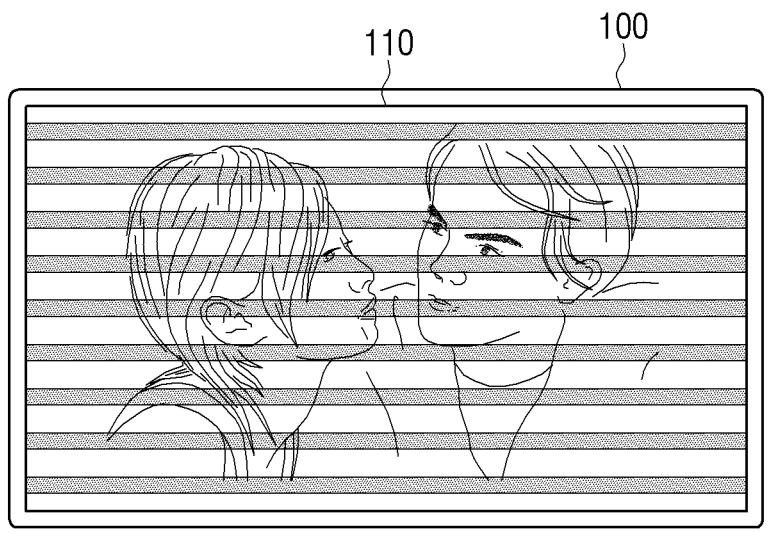
FIGS. 7A and 7B are views to describe a case of providing a security image by dividing a plurality of pixels in a display in a unit of a row or a column.
Figure 7B:
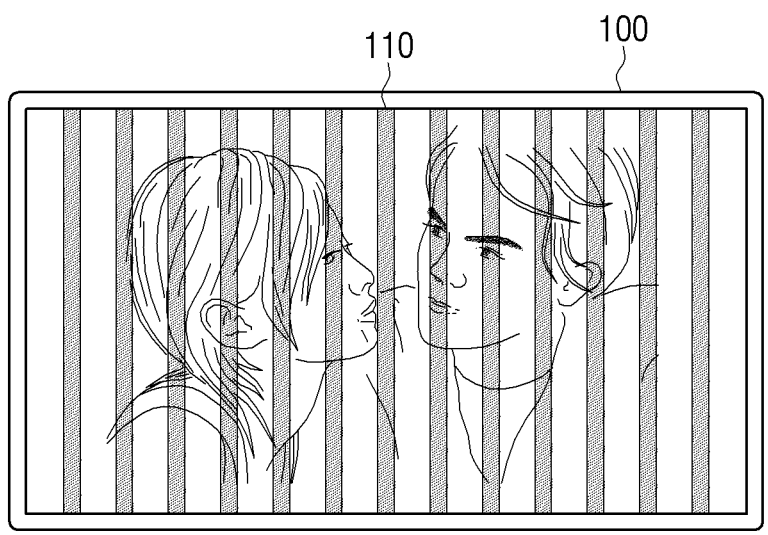

FIGS. 7A and 7B are views to describe an example of providing a security image by dividing a plurality of pixels in a display 110 in a unit of a row or a column by the processor 130.

As illustrated in FIG. 7A, as a result of driving the driver 120 to drive only the light-emitting elements constituting the pixels of a specific row based on the second PWM signal, a flicker phenomenon of a photographed image may be generated only for specific rows among a plurality of pixels included in the display 110.

Alternatively, as shown in FIG. 7B, as a result of controlling the driver 120 to drive only the light-emitting elements constituting the pixels of a particular column using the second PWM signal, a flicker phenomenon of a photographed image may occur only for specific columns among the plurality of pixels included in the display 110.

From among a plurality of pixels, specific pixels having a different frequency of the PWM signal (e.g., second PWM signal) may be pixels in which a specific pattern is displayed among a plurality of the pixels.

The specific pattern may have diverse texts, patterns, shapes, or the like, and may represent a watermark for security of the input image.

Figure 8:
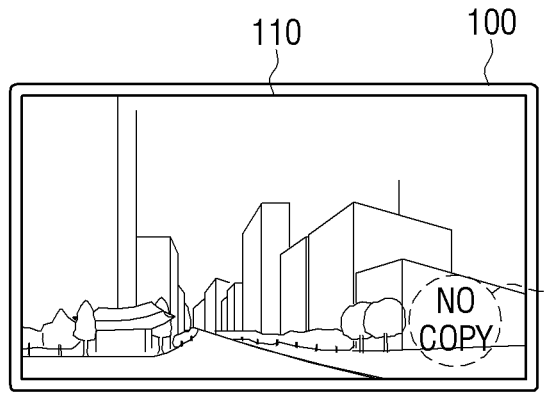
FIG. 8 is a view provided to describe various embodiments of the security image in which a specific pattern is displayed.
Figure 8:
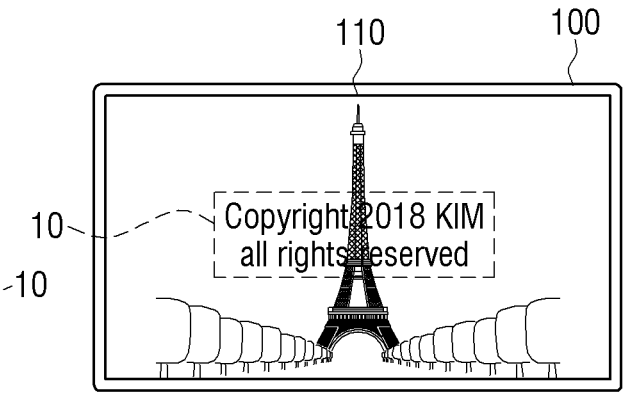
Figure 8:
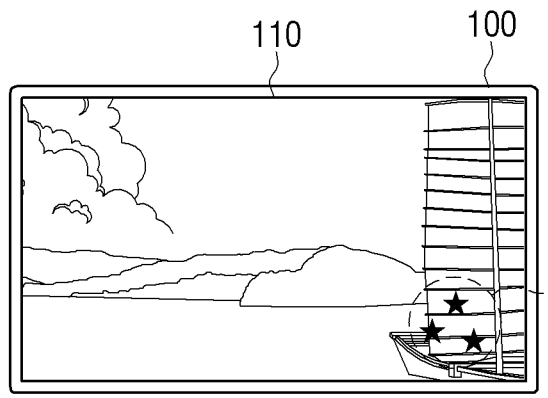
Figure 8:
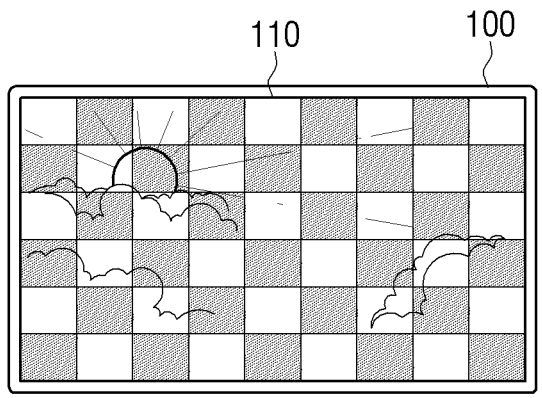
Figure 8:
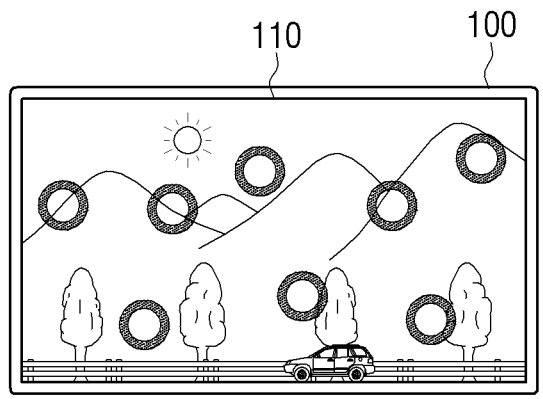
Figure 8:
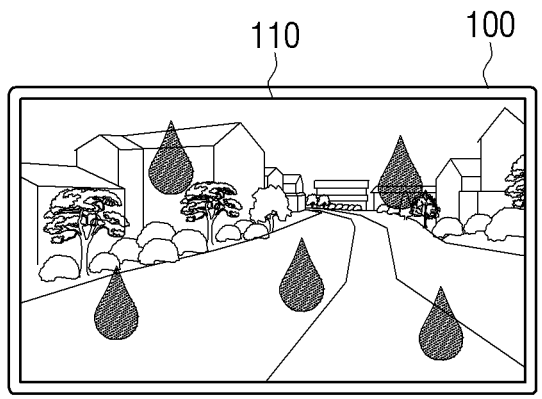

FIG. 8 is a view provided to describe various embodiments of the security image in which a specific pattern is displayed. Various watermarks 10, patterns, and the like shown in FIG. 8 may not be seen when the display 110 is viewed directly by the naked eyes, but may be perceived through an image photographed through an external photographing device.

As shown in (a)-(c) of FIG. 8, the processor 130 may control the driver 120 to drive the light-emitting elements constituting the specific pixels in which various watermarks 10 such as specific texts and shapes are displayed using the second PWM signal and to drive other light-emitting elements based on the first PWM signal.

When a copyright holder is displayed as shown in (b), there is an advantage that not only unauthorized and illegal photographing of the image displayed on the display 110 may be prevented, but also when unauthorized and/or illegal images are distributed later, a source or the copyright holder of the image may be informed to people who come to view the distributed image.

As shown in (d)-(f) of FIG. 8, the processor 130 may control the driver 120 to drive the light-emitting elements of the specific pixel in which a pattern such as a grid pattern, a circle pattern, a water droplet pattern, etc. are displayed, using the second PWM signal.

The watermarks and patterns corresponding to the specific pixel are not limited to the embodiments of FIG. 8, and various other watermarks and/or patterns may be output.

The processor 130 may control the driver 120 to drive the light-emitting elements constituting the specific pixel through the second PWM signal, and drive the light-emitting elements constituting the other pixels excluding the specific pixels through the first PWM signal, based on types of the contents of the input image.

The content type of the input image may be a movie, a drama, entertainment, a documentary, or the like, and may be a broadcast program that is broadcast in real time.

When receiving data or a signal with respect to the input image from an external source through a communicator or an input and output port, the processor 130 may receive metadata as well. In this case, the processor 130 may identify the content type of the input image based on information (e.g., information or an index value indicating a content type) included in the metadata.

Specifically, the processor 130 may control the driver 120 to drive light-emitting elements constituting the specific pixels corresponding to different types of patterns or shapes according to the contents type of the input image, using the second PWM signal.

Alternatively, when the contents corresponding to the input image are predetermined contents, the processor 130 may provide a security image.

Specifically, when the contents corresponding to the input image coincide with the contents previously stored in the display apparatus 100, the processor 130 may provide a security image by controlling the driver 120 and the display 110.

Alternatively, when metadata of the input image received from the outside includes copyright information on the contents corresponding to the input image, the processor 130 may provide a security image.

The processor 130, based on a user setting, may control the driver 120 to drive the light-emitting elements constituting the specific pixels using the second PWM signal and drive the light-emitting elements constituting the other pixels excluding the specific pixels using the first PWM signal.

In this case, the user setting may be at least one of whether the security image is displayed, a pattern and/or shape of the security image, and a display time and/or duration of the security image.

For example, the processor 130 may control the driver 120 to drive the light-emitting elements constituting the specific pixels corresponding to the pattern and shape set by a user using the second PWM signal. In addition, the processor 130 may provide a security image only during the time set by the user.

Figure 9:
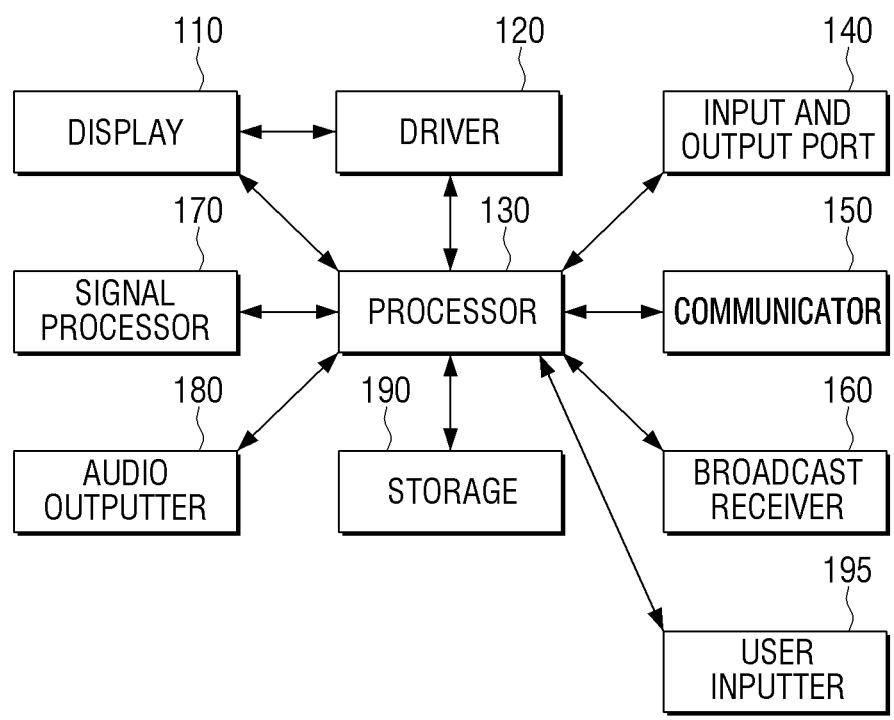
FIG. 9 is a block diagram provided to describe a configuration of the display apparatus according to an embodiment.

FIG. 9 is a block diagram provided to describe a configuration of a display apparatus 100 according to an embodiment.

Referring to FIG. 9, the display apparatus 100 may further include at least one of an input and output port 140, a communicator 150, a broadcast receiver 160, a signal processor 170, an audio outputter 180, a storage 190, and a user inputter 195 (e.g., user input unit or device), in addition to the display 110, the driver 120, and the processor 130.

Through the input and output port 140, the display apparatus 100 may receive an image signal from the outside or transmit an image signal to the outside.

For this purpose, the input and output port 140 may be implemented as a wired port such as at least one of a high-definition multimedia interface (HDMI) port, a display port, a red, green, blue (RGB) port, a digital visual interface (DVI) port, Thunderbolt port, component port, and the like. Alternatively (or additionally), the input and output port 140 may be implemented as a port for wireless communication such as at least one of Wi-Fi and Bluetooth communication, or the like.

A signal of the input image received through the input and output port 140 may include information on the grayscale of the input image.

The communicator 150 is configured to communicate with various types of external devices according to various types of communication methods. The communicator 150 may include a Wi-Fi chip and a Bluetooth chip.

The processor 130 may communicate with various external devices using the communicator 150. The communicator 150 may perform data communication by wire and/or wirelessly with an external device.

When performing data communication with an external device by a wireless communication method, the communicator 150 may include at least one of a Wi-Fi direct communication module, a Bluetooth module, an infrared data association (IrDA) module, a near field communication (NFC) module, a Zigbee module, a cellular communication module, a third generation (3G) mobile communication module, a fourth generation (4G) mobile communication module, a 4G long term evolution (LTE) communication module, a fifth generation (5G) mobile communication module, etc.

The display apparatus 100 may receive data on an image through the communicator 150. The data on the image may include information on at least one of grayscale of an image, copyright information of the image, and the like.

In this case, the display apparatus 100 may drive a plurality of light-emitting elements included in the display 110 based on the PWM signal having the duty corresponding to the grayscale of the image to display the image on the display 110.

The display apparatus 100 may drive the light-emitting elements constituting the specific pixels in which the texts are displayed based on the copyright information of the image, from among a plurality of pixels of the display 110, based on the second PWM signal having a lower frequency than the first PWM signal for the light-emitting elements constituting the other pixels. As a result, even if an image displayed on the display 110 is photographed by an external photographing device, a text corresponding to the copyright information of the image is displayed by the flicker phenomenon in the photographed image. As such, illegal and/or unauthorized photographing may be prevented.

The broadcast receiver 160 may receive a signal on the broadcast contents. The broadcast contents may include an image, audio, and additional data (for example, EPG), and the broadcast receiver 160 may receive a broadcast contents signal from various sources such as terrestrial broadcasting, cable broadcasting, satellite broadcasting, Internet broadcasting, or the like.

The broadcast receiver 160 may be implemented to include configurations such as tuner, a demodulator, and an equalizer for receiving broadcast contents transmitted from a broadcasting company or source.

The display apparatus 100 may display the image included in the broadcast contents received through the broadcast receiver 160 on the display 110.

A signal processor 170 may process or work an input image and/or an audio signal. The signal processor 170 may generate a new signal based on the input image and/or audio signal.

The signal processor 170 may generate the PWM signal and/or the dimming signal corresponding to the grayscale of the image, based on the grayscale information of the image included in the image signal and data inputted to the display apparatus 100. Here, the generated PWM signal and/or dimming signal may be provided to the driver 120.

The signal processor 170 may, when the display apparatus 100 provides a security image, generate a PWM signal for driving a light-emitting element of the specific pixels and a PWM signal for driving a light-emitting element of the pixels other than the specific pixels.

The signal processor 170 may include at least one of an analog to digital (A/D) converter, a digital signal processor (DSP), and an integrated circuit (IC) for signal processing.

The audio outputter 180 (e.g., audio output unit or device) may output a voice or audio included in the signal and/or data inputted through the input and output port 140, the communicator 150, and/or the broadcast receiver 160, and/or output audio included in prestored voice or audio data.

For this purpose, the audio outputter 180 may include a speaker and a headphone and/or earphone output terminal.

The storage 190 may store commands or data related to the components of the display apparatus 100 and the operating system (OS) for controlling overall operations of the components of the display apparatus 100.

For this purpose, the storage 190 may be implemented as a non-volatile memory (for example, hard disk drive, solid state drive (SSD), flash memory, etc.), volatile memory, or the like.

The storage 190 may store information on specific pixels corresponding to various patterns, shapes, and texts as described above. In addition, the storage 190 may include information on the specific pixels corresponding to the various patterns, shapes, and texts as described above. At this time, the information on the specific pixels may include information on coordinates of the specific pixels.

The storage 190 may store information on the contents which are preset to have a security image provided or displayed therewith. The information on the preset contents may include information on types of the contents, information on the copyright holder of the contents, or the like.

The user inputter 195 may receive an input of various user commands. The processor 130 may execute a function to correspond to a user command that is inputted through the user inputter 195.

The user inputter 195 may include a microphone to receive a user command in a format of a voice, may be implemented as a touch screen to receive an input of a user command as a touch along with the display 110, and/or be implemented as a separate touchpad or a button type (e.g., remote controller).

The display apparatus 100 may receive a user command related to at least one of whether the security image is provided, patterns or texts that are represented through the security image, time for providing a security image, or the like, through the user inputter 195.

Figure 10:
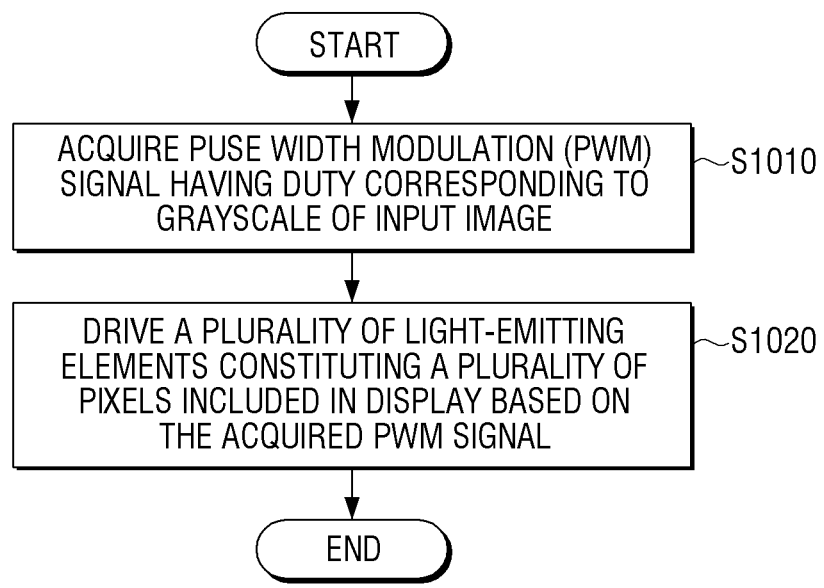
FIG. 10 is a flowchart provided to describe a controlling method of a display apparatus according to an embodiment.

FIG. 10 is a flowchart provided to describe a controlling method of a display apparatus according to an embodiment.

The controlling method may acquire a PWM signal having a duty corresponding to the grayscale of the input image in operation S1010. For example, a first PWM signal and a second PWM signal having duties corresponding to the grayscale of the input image may be acquired.

Based on the acquired PWM signals, a plurality of light-emitting elements that constitute a plurality of pixels included in the display of the display apparatus may be driven in operation S1020.

In this case, light-emitting elements constituting specific pixels among the plurality of pixels are driven using the first PWM signal, and light-emitting elements constituting pixels other than the specific pixels may be driven using the second PWM signal having a frequency that is different from the frequency of the first PWM signal. In addition, the frequency of the first PWM signal may be less than the frequency of the second PWM signal.

At this time, a plurality of pixels may be divided into a plurality of groups, and a plurality of light-emitting elements constituting the pixels of a specific group, among the plurality of divided groups, may be driven based on the first PWM signal.

In this case, if a display includes a plurality of modular displays including one or more pixels, respectively, a plurality of pixels may be divided into a plurality of groups based on a unit of a modular display.

Alternatively, a plurality of pixels arranged in a matrix form may be divided into a plurality of groups in a unit of a row or a column.

Figure 11:
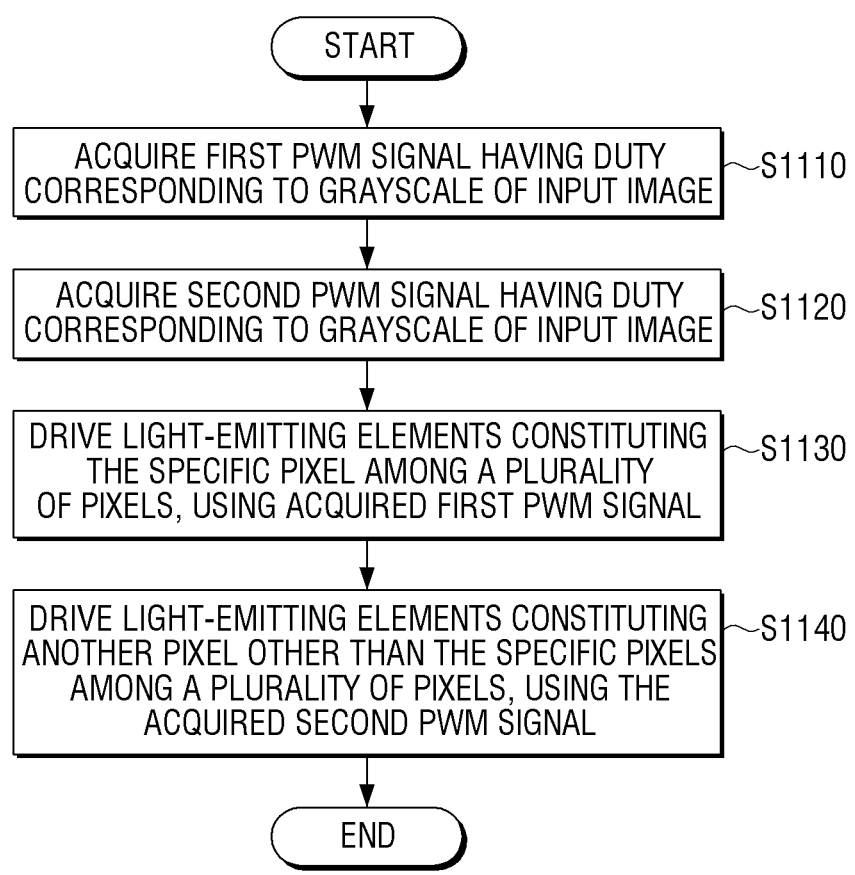
FIG. 11 is a flowchart to describe a detailed controlling method of a display apparatus according to an embodiment.

FIG. 11 is a flowchart to describe a detailed controlling method of a display apparatus according to an embodiment.

Referring to FIG. 11, the controlling method may include acquiring a first PWM signal having a duty corresponding to a grayscale of an input image in operation S1110.

In addition, the second PWM signal having a duty to correspond to the grayscale of the input may be acquired in operation S1120. In this case, the frequency of the second PWM signal may be greater than the frequency of the first PWM signal.

At this time, the light-emitting elements constituting specific pixels, among a plurality of pixels, are driven using the acquired first PWM signal in operation S1130, and the light-emitting elements constituting pixels other than the specific pixels, among the plurality of pixels, may be driven using the acquired second PWM signal in operation S1140.

In the controlling methods of FIGS. 10 and 11, the specific pixel may be a pixel in which a specific pattern is displayed, among a plurality of pixels. For example, the pixels may be pixels in which specific texts, patterns, shapes, or the like are displayed.

In addition, the specific pattern may be a pattern to represent a watermark for security of the input image.

Furthermore, the frequency of the first PWM signal may be less than a frequency corresponding to a shutter speed of one or more external photographing devices that photograph an image. In addition, the frequency of the first PWM signal may be greater than a frequency corresponding to perceivable visual characteristics of a human.

In contrast, the frequency of the second PWM signal may be greater than the frequency corresponding to perceivable visual characteristics of a human, and greater than the shutter speed of one or more external photographing devices that photograph an image.

In addition, even if the light-emitting elements of the specific pixels among the plurality of pixels are driven using the first PWM signal, and the light-emitting elements of the other pixels are driven based on the second PWM signal, the duties of the two PWM signals above are maintained to both correspond to the grayscale of the input image.

The controlling method may include acquiring coordinates of the pixels corresponding to the prestored patterns or shapes to provide a security image, and then driving the light-emitting elements of the specific pixels corresponding to the acquired coordinates using the first PWM signal. In this case, the light-emitting elements of the other pixels not corresponding to the acquired coordinates may be driven using the second PWM signal.

Meanwhile, in driving the plurality of light-emitting elements, based on at least one of the types of the contents of the input image or the user setting, the light-emitting elements constituting the specific pixel may be driven using the first PWM signal, and the light-emitting elements constituting the pixels other than the specific pixels may be driven using the second PWM signal.

Figure 12:
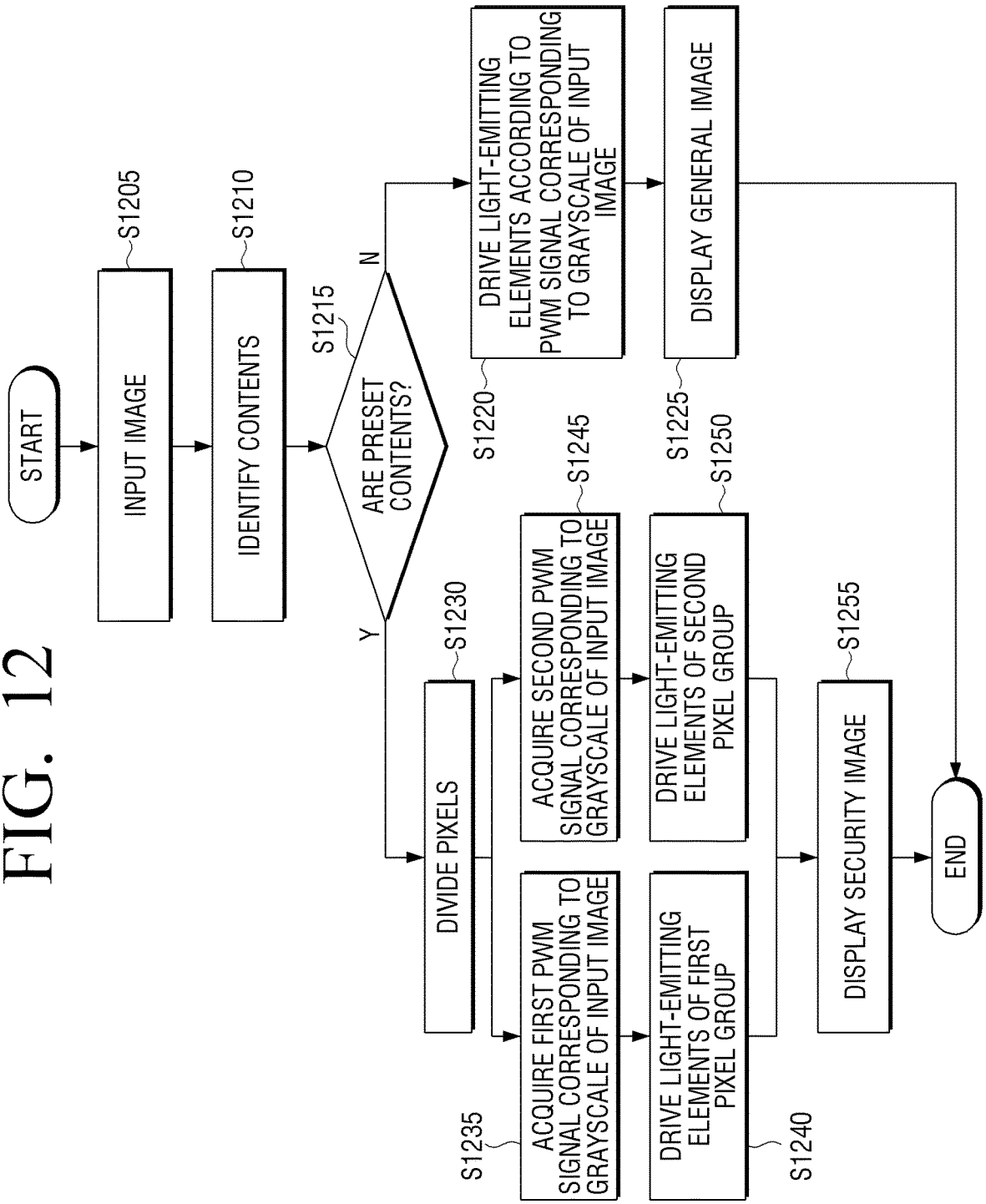
FIG. 12 illustrates an algorithm to describe a case of providing a security image based on contents identification corresponding to an input image, according to an embodiment.

FIG. 12 illustrates an algorithm to describe a case of providing a security image based on contents identification corresponding to an input image, according to an embodiment.

If an image is input from an external source in operation S1205, it is possible to identify what contents correspond to the input image in operation S1210. Specifically, the contents corresponding to the input image may be identified based on information on the images received with the images (e.g., metadata) in the process of receiving the signal and/or data for the image. The contents (e.g., type of contents) may also be identified or determined based on an image analysis performed by a display apparatus or image processing apparatus.

Whether the identified contents correspond to preset contents may be determined in operation S1215. The preset contents may correspond to the contents of a specific type, contents including a copyright holder information, or the like.

As a result of the identification, if the contents are not the preset contents in operation S1215-N, the security image is determined to not be provided. In this case, in order to display the input image, a plurality of light-emitting elements may be driven according to the PWM signal corresponding to the input image in operation S1220. As a result, a general image, not a security image in which a flicker phenomenon occurs, may be displayed when an external image photographing device photographs an image in operation S1225.

In the meantime, as a result of the identification, if the contents are determined to correspond to or be preset contents in operation S1215-Y, the security image may be provided. For example, as a result of identification of the contents based on information on the received image, if the identified contents correspond to a movie or a drama that requires (or is present to include) copyright protection, the security image may be provided. Alternatively, if the identified contents include information on the name and/or rights of the copyright holder, the security image may be provided.

In providing the security image, a plurality of pixels included in the display may be distinguished in operation S1230. Specifically, the pixels may be divided into a first pixel group in which a preset pattern or a text is displayed, among the plurality of pixels, and a second pixel group in which the preset pattern or the text is not displayed.

The PWM signal having the duty corresponding to the grayscale of the input image may be acquired. In this case, a first PWM signal and a second PWM signal having different frequencies may be acquired, respectively in operations S1235 and S1245.

Specifically, the first PWM signal having the duty corresponding to the grayscale of the first pixel group, among a plurality of pixels of the input image, and the first frequency may be acquired, and the second PWM signal having the duty corresponding to the grayscale of the second pixel group, among a plurality of pixels of the input image, and the second frequency may be acquired. At this time, the first frequency of the first PWM signal may be less than the second frequency of the second PWM signal.

The light-emitting elements of the first pixel group may be driven using the first PWM signal having the first frequency in operation S1240, and the light-emitting elements of the second pixel group may be driven using the second PWM signal having the second frequency in operation S1250.

As a result, the security image is displayed in operation S1255.

Figure 13:
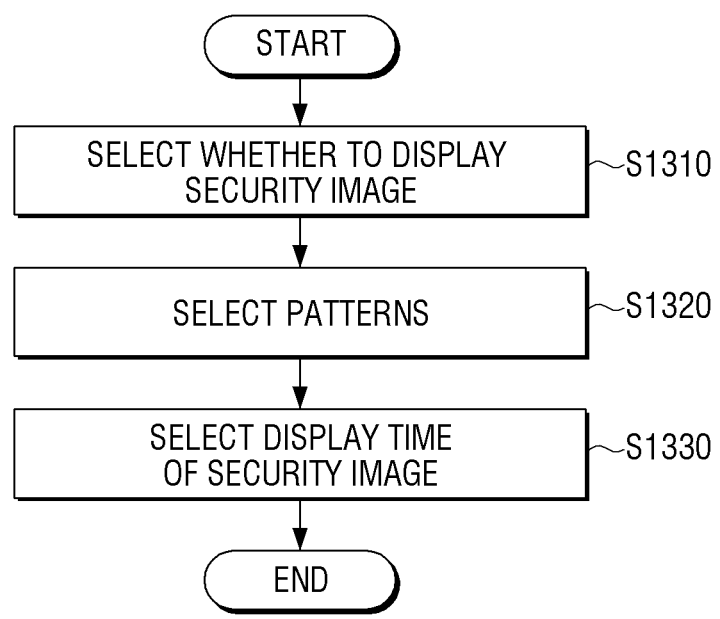
FIG. 13 is a flowchart to describe an example in which various settings of a user are performed in providing a security image, according to an embodiment.

FIG. 13 is a flowchart to describe an example of providing a UI for user settings in providing a security image, according to an embodiment.

In providing the security image, a first UI for allowing the user to select whether to display the security image may be provided in operation S1310. By way of example, the user may select whether to display the security image based on a type of the display apparatus 100, where the display apparatus 100 is used, what contents are displayed, and the like.

For example, if the display apparatus 100 corresponds to a large scale screen located in a movie theater and is currently playing a movie, the user may select to display the security image. In the meantime, if the display apparatus 100 is playing the image contents in an exhibition hall where photographing is permitted, the user may select to display a general image without displaying the security image.

After selecting whether to display the security image, a second UI for allowing the user to select a pattern or text to be used in the security image may be provided in operation S1320. At this time, the pattern or the text to be used for the security image may be prestored and the user may select one or more of the pattern or the text. Alternatively, the user may directly input texts through the second UI or select the position.

As such, when a pattern or text to be used for the security image is determined through the second UI, the light-emitting elements constituting of the specific pixel in which the determined pattern or text is to be displayed, among the plurality of pixels included in the display, may be driven using the PWM signal having a frequency that is different from a PWM signal for other pixels. As a result, the patterns, texts, or the like determined by the user may be displayed on the image that is photographed in an unauthorized or illegal manner through the flicker phenomenon.

Also, a third UI may be provided to allow the user to select a specific time for displaying the secure image in operation S1330. In the case of providing a security image, various operations of the display apparatus 100 are added rather than the case of providing a general image, so it may be effective to selectively provide a security image only at a necessary or desired time, rather than always providing a security image. In addition, it is also considered that, when a security image is provided, even if a flicker phenomenon is not recognized to the viewer viewing the image with the naked eyes, the quality of the image may be less than that of a general image as a result of lowering the frequency of the PWM signal.

To be specific, the user may, through the third UI, select whether to provide a security image for a particular period of time, reserve the time to provide the security image, or set the cycle of providing the security image.

The first to third UIs described above may be provided visually on the display as a graphic UI or may provide a menu or setting method that may be selected in the form of a voice.

The user input for user settings through the first to third UIs may be recognized by receiving a user's touch or a button or receiving a user voice.

The control method of the display apparatus described with reference to FIGS. 10 to 13 may be implemented through one or more configurations of the display apparatus 100 shown and described with reference to FIGS. 2, 3, 4A-4B, 5-6, 7A-7B, 8, and 9. It may also be implemented via a display system that includes the display apparatus 100 and one or more external devices. According to another embodiment, the control method may be implemented in an image processing apparatus (e.g., set-top box, audio/video receiver, etc.), that outputs an image to an external display.

The various embodiments described above may be implemented in a recordable medium that may be read by computer or a similar device using software, hardware, or a combination thereof.

In accordance with a hardware implementation, embodiments may be implemented by using at least one of application specific integrated circuits (ASICs), digital signal processors (DSPs), digital signal processing devices (DSPDs), programmable logic devices (PLDs), field programmable gate arrays (FPGAs), a processor, a controller, a micro-controller, a microprocessor, an electrical unit for performing other functions, etc.

In some cases, embodiments may be implemented as the processor 130 itself. According to a software implementation, embodiments such as the procedures and functions described herein may be implemented with separate software modules. Each of the software modules may perform one or more of the functions and operations described herein.

Meanwhile, the computer instructions for performing the processing operations in the display apparatus 100 according to embodiments may be stored in a non-transitory computer-readable medium. The computer instructions stored in this non-transitory computer-readable medium cause the above-described specific device to perform the processing operations in the display apparatus 100 according to the above-described various embodiments when executed by the processor of the specific device.

The non-transitory computer readable medium refers to a medium that stores data semi-permanently rather than storing data for a very short time, such as a register, a cache, a memory, etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the disclosure. The present teaching can be readily applied to other types of apparatuses. Also, the description of the embodiments of the disclosure is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined by the following claims and their equivalents.

What is claimed is:

1. A display apparatus in which each pixel corresponds to one or more light-emitting elements, the display apparatus comprising:
    a display including a plurality of pixels grouped into a plurality of modular displays;
    a driver configured to drive a plurality of light-emitting elements corresponding to the plurality of pixels; and
    a processor configured to:
        control the driver to drive light-emitting elements corresponding to first pixels included in a first modular display of the plurality of modular displays, based on a first pulse width modulation (PWM) signal having a duty corresponding to a grayscale of an input image,
        control the driver to drive light-emitting elements corresponding to second pixels included in a second modular display of the plurality of modular displays, based on a second PWM signal having the duty corresponding to the grayscale of the input image,
    wherein a frequency of the first PWM signal is different from a frequency of the second PWM signal.

2. The display apparatus of claim 1, wherein the processor is configured to divide the plurality of pixels arranged in a form of a matrix into a plurality of groups corresponding to the plurality of modular displays in a unit of a row or a column.

3. The display apparatus of claim 1, wherein the second pixels are pixels in which a specific pattern is displayed, among the plurality of pixels.

4. The display apparatus of claim 3, wherein the specific pattern corresponds to a watermark for security of the input image.

5. The display apparatus of claim 1, wherein the frequency of the second PWM signal is less than a frequency corresponding to a shutter speed of at least one external photographing device that photographs an image.

6. The display apparatus of claim 1, wherein the frequency of the second PWM signal is greater than a frequency corresponding to a visual characteristic of a human.

7. The display apparatus of claim 1, wherein the processor, based on a type of content of the input image, is configured to control the driver to drive the one or more light-emitting elements corresponding to the second pixels based on the second PWM signal.

8. The display apparatus of claim 1, wherein the frequency of the second PWM signal is less than the frequency of the first PWM signal.

9. A controlling method of a display apparatus comprising a display including a plurality of pixels grouped into a plurality of modular displays, each pixel corresponding to one or more light-emitting elements, the method comprising:
    acquiring a first PWM signal having a duty corresponding to a grayscale of an input image, and a second PWM signal having the duty corresponding to the grayscale of the input image;
    driving one or more light-emitting elements corresponding to first pixels included in a first modular display of the plurality of modular displays, based on the first PWM signal; and
    driving one or more light-emitting elements corresponding to second pixels included in a second modular display of the plurality of modular displays, based on the second PWM signal,
    wherein a frequency of the first PWM signal is different from a frequency of the second PWM signal.

10. The controlling method of claim 9, further comprising dividing the plurality of pixels arranged in a form of a matrix into a plurality of groups corresponding to the plurality of modular displays in a unit of a row or a column.

11. The controlling method of claim 9, wherein the second pixels are pixels in which a specific pattern is displayed, among the plurality of pixels.

12. The controlling method of claim 11, wherein the specific pattern corresponds to a watermark for security of the input image.

13. The controlling method of claim 9, wherein the frequency of the second PWM signal is less than a frequency corresponding to a shutter speed of at least one external photographing device that photographs an image.

14. The controlling method of claim 9, wherein the frequency of the second PWM signal is greater than a frequency corresponding to a visual characteristic of a human.

15. The controlling method of claim 9, wherein the driving the one or more light-emitting elements corresponding to the second pixels comprises, based on a type of content of the input image, driving the one or more light-emitting elements corresponding to the second pixels based on the second PWM signal.

16. A processing apparatus comprising:
    a memory storing instructions; and
    at least one processor configured to execute the instructions to:
        obtain a first PWM signal for driving one or more light-emitting elements corresponding to first pixels included in a first modular display of a plurality of modular displays, the first PWM signal having a duty corresponding to a grayscale of an input image, and
        obtain a second PWM signal for driving one or more light-emitting elements corresponding to second pixels included in a second modular display of the plurality of modular displays, the second PWM signal having the duty corresponding to the grayscale of the input image, wherein a frequency of the first PWM signal is different from a frequency of the second PWM signal.

\* \* \* \* \*